(12) United States Patent
Nasser et al.

(10) Patent No.: US 10,928,511 B2
(45) Date of Patent: Feb. 23, 2021

(54) SYNCHRONOUS SHORT RANGE RADARS FOR AUTOMATIC TRAILER DETECTION

(71) Applicant: Ford Global Technologies, LLC, Dearborn, MI (US)

(72) Inventors: Ebrahim Nasser, Dearborn, MI (US); Conrad M. Smith, Saint Joseph, MI (US); Kenneth J. Snarski, Chesterfield, MI (US); Scott Howard Gaboury, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 470 days.

(21) Appl. No.: 15/834,923

(22) Filed: Dec. 7, 2017

(65) Prior Publication Data

US 2019/0179010 A1    Jun. 13, 2019

(51) Int. Cl.
| | | |
|---|---|---|
| *G01S 13/931* | (2020.01) | |
| *B60D 1/58* | (2006.01) | |
| *B60D 1/36* | (2006.01) | |
| *G01S 13/87* | (2006.01) | |
| *B60D 1/62* | (2006.01) | |

(52) U.S. Cl.
CPC .............. *G01S 13/931* (2013.01); *B60D 1/36* (2013.01); *B60D 1/58* (2013.01); *B60D 1/62* (2013.01); *G01S 13/87* (2013.01); *G01S 2013/9315* (2020.01); *G01S 2013/93274* (2020.01)

(58) Field of Classification Search
CPC .................................... B60D 1/36; B60D 1/58
See application file for complete search history.

(56) References Cited

U.S. PATENT DOCUMENTS

| | | | |
|---|---|---|---|
| 6,268,803 B1 | 7/2001 | Gunderson et al. | |
| 6,683,560 B2 | 1/2004 | Bauhahn | |
| 7,301,479 B2 | 11/2007 | Regan | |
| 8,134,491 B1 * | 3/2012 | Meyer | G01S 13/48 342/65 |
| 9,211,889 B1 * | 12/2015 | Hoetzer | G01S 15/931 |
| 9,227,474 B2 * | 1/2016 | Liu | B60D 1/245 |
| 9,594,155 B2 | 3/2017 | Cashler et al. | |
| 2008/0186204 A1 * | 8/2008 | Buckley | G08G 1/167 340/901 |
| 2013/0314271 A1 * | 11/2013 | Braswell | G01S 13/931 342/70 |
| 2015/0325126 A1 | 11/2015 | Schwindt | |
| 2016/0101730 A1 * | 4/2016 | Shehan | G01S 13/931 340/431 |

(Continued)

FOREIGN PATENT DOCUMENTS

EP    2523015 A1    11/2012

*Primary Examiner* — Marcus E Windrich
(74) *Attorney, Agent, or Firm* — Frank Lollo; Eversheds Sutherland (US) LLP

(57) ABSTRACT

Method and apparatus are disclosed for synchronous short range radars for automatic trailer detection. An example radar module for a vehicle includes a radar, and a controller coupled to memory. The controller measures, with the radar, a target area proximate the vehicle. Based on the measurements, the controller determines clutter and trailer connection states. The controller sends a clutter message on a data bus indicative of the clutter state, and sends a connection message based on either (a) the trailer connection state or (b) clutter and trailer connection states of another radar module.

10 Claims, 4 Drawing Sheets

(56) References Cited

U.S. PATENT DOCUMENTS

| | | | |
|---|---|---|---|
| 2016/0252610 A1* | 9/2016 | Smith | G01S 13/04 |
| | | | 342/27 |
| 2017/0363728 A1* | 12/2017 | Prasad | B60W 40/12 |
| 2018/0068566 A1* | 3/2018 | Prasad | B60W 30/12 |
| 2018/0174470 A1* | 6/2018 | Rysdyk | G05D 1/106 |
| 2018/0203106 A1* | 7/2018 | Di | G01S 7/411 |

* cited by examiner

SYNCHRONOUS SHORT RANGE RADARS FOR AUTOMATIC TRAILER DETECTION

TECHNICAL FIELD

The present disclosure generally relates to automatic trailer detection and, more specifically, synchronous process on a vehicle data bus short-range radars for automatic trailer detection.

BACKGROUND

To detect a when a trailer is connected, a towing vehicle receives a trailer connection status from a trailer brake module a trailer lighting module when the operator connects a trailer harness to the towing vehicle. Towing vehicles may also include blind spot detection systems that use radars to detect other vehicles to the side and rear of the vehicle. The blind spot detection system provides an alert so that drivers are aware of vehicles in the vicinity that they may not be able to see. Vehicles that tow trailers may also include a trailer blind spot system with automatic trailer detection that detects when a trailer is attached to the vehicle and extends the blind spot detection range to cover the trailer length. Automatic trailer detection provides an indicator to the rest of the systems of the vehicle that a trailer has been connected so these system can adjust their functions accordingly. Sometimes a dashboard may indicate to the driver that a trailer has been connected. However, when the area on the sides of the vehicle are cluttered (e.g., the area around the vehicle has a lot of reflective surfaces, such as parked cars in a packed parking lot), the automatic trailer detection cannot detect the trailer presence. The automatic trailer detection may be intermittent when the clutter clears on one side of the vehicle, but not on the other. As such, because the two sides of the automatic trailer detection system do not coordinate, the driver may receive intermittent indications of whether the trailer is connected regardless of whether the trailer is actually connected.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for synchronous short range radars for automatic trailer detection. An example radar module for a vehicle includes a radar, and a controller coupled to memory. The controller measures, with the radar, a target area proximate the vehicle. Based on the measurements, the controller determines clutter and trailer connection states. The controller sends a clutter message on a data bus indicative of the clutter state, and sends a connection message based on either (a) the trailer connection state or (b) clutter and trailer connection states of another radar module.

An examples vehicle includes a first radar module that monitors a first area proximate the vehicle and a second radar module that monitors a second different area proximate the vehicle. When the first radar module does not detect radar clutter, the first radar module determines whether a trailer is connected. When the first radar module detects the trailer, the first radar module sends a trailer message on a data bus indicating that the trailer is connected. The second radar accepts the result and change its status to trailer connected. When the first radar modules does not detect the trailer, the first radar modules sends the trailer message indicating that the trailer is not connected only when the second radar module also determines that the trailer is not connected.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
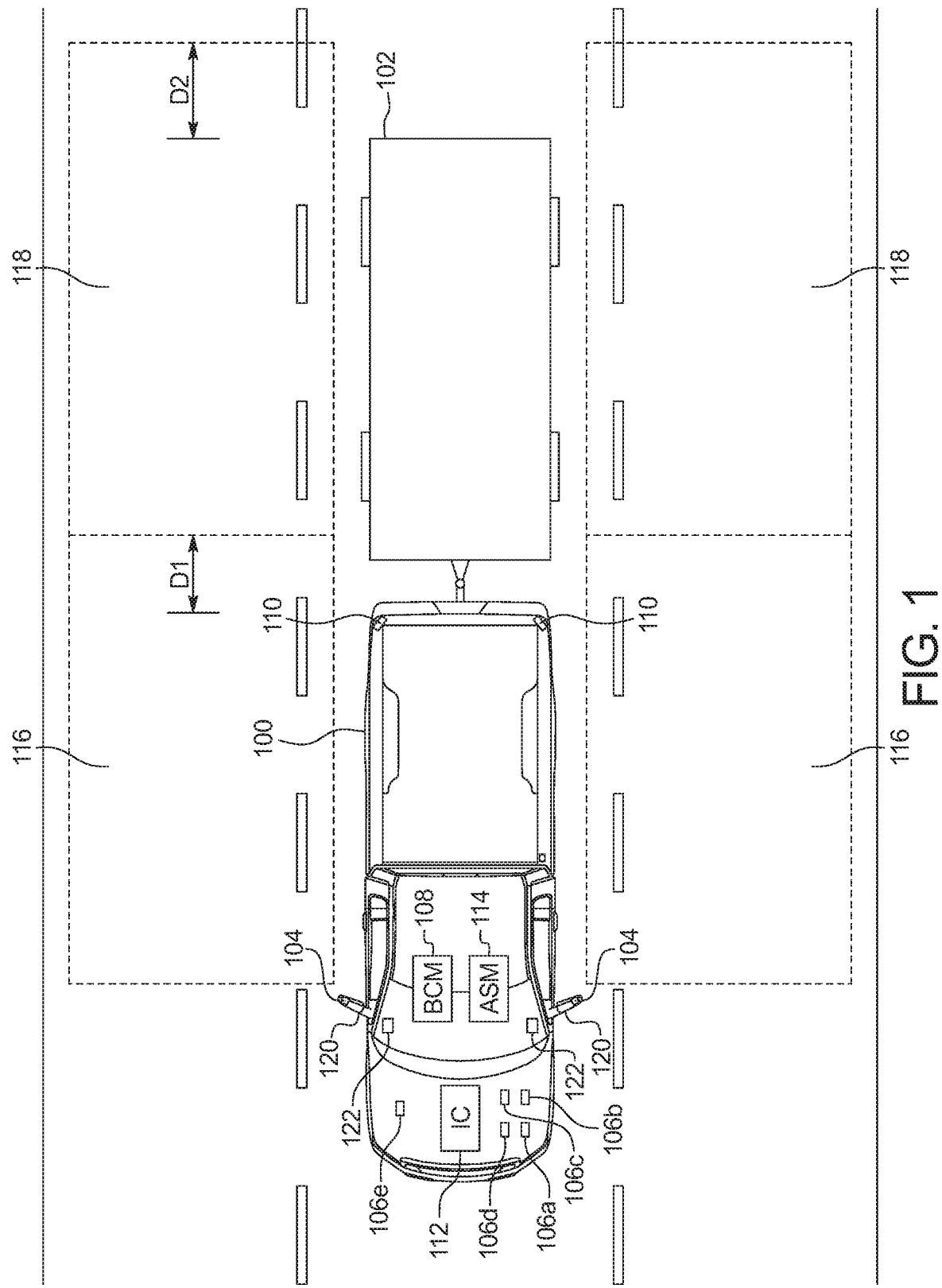
FIG. 1 illustrates a vehicle towing a trailer and operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

An automated trailer detection system uses short range radar modules on each side to a vehicle to detect when a trailer is connected to the vehicle. Traditionally, the short range radar modules independently determine whether the trailer is connected. However, when the environment on the side of the vehicle is cluttered, the corresponding short range radar module cannot determine whether the trailer is connected. In that scenario, the short range radar module sends an indication to an instrument cluster that the trailer is not detected. Once the clutter clears on one or both of the sides, one or both of the short range radar modules may detect the trailer and send a corresponding indication to the instrument cluster. Or, in some scenarios, the short range radar modules may detect contradictory states. That is, one short range radar module may detect the trailer and so indicate while the other short range radar module, because of the clutter, does not and so indicates. To the driver and the vehicles systems that are affected by the presence of the trailer, this may appear as an intermittent or inconsistent behavior of the vehicle if the contradiction is not managed and resolved.

As disclosed below, synchronous short range radar modules are positioned on the rear corners of the vehicle. The synchronous short range modules include radar that is used to (a) detect objects in a blind spot of the vehicle and (b) automatically detect when a trailer is attached to the vehicle.

When automatically detecting when a trailer is attached to the vehicle, the synchronous short range modules coordinates with each other to prevent contradictory and/or intermittent indicators being presented to the driver. To coordinate, the synchronous short range radar modules perform handshaking using messages broadcast on a vehicle data bus. Initially, the synchronous short range radar modules independently determine their own status. The statuses include (i) whether the radar detects clutter in its field of view (e.g., its "clutter state") and (ii) whether the radar detects that the trailer is attached to the vehicle (e.g., its "trailer detection state"). The clutter state is "pending" when synchronous short range radar module is analyzing measurements from the associated radar to determine whether clutter is detected. The clutter state is "terminated" when the synchronous short range radar module has stopped attempting to determine whether the environment is cluttered. For example, the synchronous short range radar module may stop attempting to determine whether the environment is cluttered after receiving a message that the trailer search is being abandoned (e.g., because the speed of the vehicle is greater than a threshold, because a search timer has timed out, etc.). The clutter state is "cluttered" when the synchronous short range radar module determines that the positioning and number of reflective objects in the field of view of the radar create an environment in which the trailer, if present, cannot be distinguished from the surrounding noise. The clutter state is "not cluttered" when the synchronous short range radar module determines that the environment is such that the trailer, if present, can be distinguished from the surrounding noise. When its clutter state is "not cluttered," the synchronous short range radar module analyzes the radar data to determine whether the trailer is attached to the vehicle (e.g., the trailer detection state is either "trailer detected" or "trailer not detected").

When the clutter state is established or changes (e.g., from "pending" to "cluttered," etc.), the synchronous short range radar module broadcasts its state on the vehicle data bus. For example, at the start of a search of the trailer, the synchronous short range radar module sets its clutter state to "pending" and broadcasts that state onto the vehicle data bus. After determining its own status, the synchronous short range radar module determines whether to broadcast a message on the vehicle data bus regarding its trailer detection status based on the clutter state of the other synchronous short range radar module. When the trailer detection state of the synchronous short range radar module is "trailer detected," the synchronous short range radar module broadcasts a message on the vehicle data bus so indicating. In response to the message indicating that the trailer has been detected, an instrument panels provides a corresponding indicator. When the trailer detection state of the synchronous short range radar module is "trailer not detected," the synchronous short range radar module only broadcasts a message on the vehicle data bus so indicating (a) when the clutter state of the other synchronous short range radar module is neither "pending" nor "cluttered" and (b) the trailer detection state of the other synchronous short range radar module is not "trailer detected." That is the synchronous short range radar module broadcasts a message that the trailer is detected when it detects the trailer, but only broadcasts a message that the trailer is not detected when (i) the other synchronous short range radar module capable of detecting whether the trailer is connected and (ii) the other synchronous short range radar hasn't detected that the trailer is connected. In response to the message indicating that the trailer has not been detected, the instrument panels provides a corresponding indicator. In such a manner, the different synchronous short range radar modules do not provide intermittent or contradictory messages to the driver or to the electronic control units that control the vehicle differently based on the presence of a trailer (e.g., power train control unit, an active safety module, the blind spot detection system, etc.).

FIG. 1 illustrates a vehicle 100 towing a trailer 102 and operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes alert indicators 104, electronic control units (ECUs) 106a-106e, a body control module 108, synchronous short range radar module 110, an instrument cluster 112, and an active safety module 114.

The alert indicators 104 alert a driver when an object, such as another vehicle, is in a blind spot detection zone (e.g., the blind spot detection zones 116 and 118). The indicators 104 are positioned on the vehicle 100 such that the driver notices the indicator 104 while driving. In some examples, the alert indicators 104 are located on the side view mirrors 120. In such examples, the indicators 104 illuminate on one of the side view mirrors 120 that correspond to the side of the vehicle 100 one which the object is detected. In some examples, the indicators 104 are light emitting diodes (LEDs) that are embedded in the housing of the side view mirrors 120. Alternatively or additionally, the indicators 104 are behind a mirror of the side view mirrors 120 and, when illuminated, are visible through the mirror. Alternatively or additionally, in some examples, the indicators 104 are embedded in the cabin in the A-pillar. In some examples, the indicators 104 are located in different locations on the different sides of the vehicle 100 to facilitate being viewable by the driver. For example, one indicator 104 may be embedded into the housing of the side view mirror 120 on the driver's side of the vehicle and another indicator 104 may be embedded into the A-pillar of the passenger's side of the vehicle 100.

The ECUs 106a-106e monitor and/or control subsystems of the vehicle 100. The ECUs 106a-106e of the illustrated example change their operation based on whether the trailer 102 is attached to the vehicle 100. The ECUs 106a-106e may, for example, change operational parameters based on a message on a vehicle data bus (e.g., the vehicle data bus 202 of FIG. 2 below) that indicates that the trailer 102 is attached to the vehicle 100. For example, to prevent false alerts by the trailer due to the trailer body reflecting radar waves instead of other vehicles, a rear cross traffic alert is either turned off manually by the customer or automatically by the corresponding ECU when the ECU detects the trailer connection status indicative of the trailer being connected. In the illustrated example, the ECUs 106a-106e include a trailer brake module (TBM) 106a, a power steering control module (PSCM) 106b, a transmission control module (TCM) 106c, a park aid module (PAM) 106d, and a reverse brake assist (RBA) module 106e. The trailer brake module 106a controls the brakes of the trailer 102 when the trailer 102 is connected. The power steering control module 106b provides steering torque to the steering column of the vehicle 100 based input from the driver via the steering wheel. The power steering control module 106b dynamically changes the ratio between the steering wheel input and the steering torques based on, in part, whether the trailer 102 is connected. The park aid module 106d senses the area behind the vehicle 100 and provides warnings to assist a driver when parking the vehicle 100. The presence of the trailer 102 affects the area that the park aid module 106d monitors and, in some examples, the sensors (e.g., ultrasonic sensors, etc.) that the park aid module 106d uses to monitor the environment around the vehicle 100. The reverse brake assist module 106e provides warnings and, in some examples, automatically applies the brakes when, while traveling in reverse, the vehicle 100 detects an obstacle. The presence of the trailer 102 affects the area that the reverse brake assist module 106e monitors and, in some examples, the sensors (e.g., ultrasonic sensors, etc.) that the park aid module 106d uses to monitor the environment around the vehicle 100.

The body control module 108 controls various subsystems of the vehicle 100. For example, the body control module 108 may control power windows, power locks, an immobilizer system, and/or power mirrors, etc. The body control module 108 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 108 is communicatively couples to door control units 122 in doors of the vehicle 100. The body control module 108 illuminates, via the door control units 122, the indicators 104 when the active safety module 114 detects an object in one of the blind spot detection zones 116 and 118.

The synchronous short range radar modules 110 are position on the rear corners of the vehicle 100. The synchronous short range radar modules 110 include radar that is used to (a) detect objects in the blind spot detection zones 116 and 118 and (b) automatically detect when the trailer 102 is attached to or detached from to the vehicle 100. In the illustrated example, the synchronous short range radar modules 110 define blind spot detection zones 116. The blind spot detection zones 116 extend into the corresponding adjacent lanes to for a predetermined distance (D1) beyond the back of the vehicle 100. When the trailer 102 is connected, the synchronous short range radar modules 110 define extended blind spot detection zones 116 that extend into the corresponding adjacent lanes to for a predetermined distance (D2) beyond the back of the trailer 102.

After the vehicle 100 is initialized (e.g., after the ignition has been started), the synchronous short range radar modules 110 is their respective radar to detect whether the trailer 102 is connected by performing pattern recognition on measurements from the radar (e.g., the radar performs cluster analysis on radar wave returns which generates object detection data and object classification output in the radar ECU). The synchronous short range radar modules 110 continue to attempt to determine whether the trailer 102 is connected until (a) the trailer 102 is detection or (b) the search for the trailer 102 is terminated. The search of the trailer 102 is terminated when the speed of the vehicle 100 is above a threshold speed (e.g., 10 miles per hour, etc.) or after a threshold period of time has elapsed. In some examples, when search of the trailer 102 is terminated, the synchronous short range radar modules 110 set the trailer detection status to what the trailer detection status was when the vehicle 100 was last initialized.

When automatically detecting when the trailer 102 is attached to the vehicle 100, the synchronous short range radar modules 110 coordinate with each other to prevent contradictory and/or intermittent indicators being presented to the driver via the instrument cluster 112. To coordinate, the synchronous short range radar modules 110 perform handshaking using messages broadcast on the vehicle data bus. Initially, the synchronous short range radar modules 110 independently determine their own status using measurements from its radar. The statuses include (i) whether the radar detects clutter in its field of view (e.g., its "clutter state") and (ii) whether the radar detects that the trailer 102 is attached to the vehicle (e.g., its "trailer detection state"). The clutter state is "pending" when synchronous short range radar module is analyzing measurements from the associated radar to determine whether clutter is detected. The clutter state of the synchronous short range radar module 110 is pending when the synchronous short range radar module 110 is initially activated. The clutter state is "terminated" when the synchronous short range radar module 110 has stopped attempting to determine whether the environment is cluttered in response to receiving a message that the trailer search is being abandoned (e.g., because the speed of the vehicle 100 is greater than the threshold speed, because a search timer has timed out, etc.). The clutter state is "cluttered" when the synchronous short range radar module 110 determines that the positioning and number of reflective objects in the field of view of the radar create an environment in which the trailer 102, if present, cannot be distinguished from the surrounding noise. For example, the vehicle 100 may be near other vehicles such that the synchronous short range radar module 110 may not be able to distinguish between other vehicles and the trailer 102. The clutter state is "not cluttered" when the synchronous short range radar module 110 determines that the environment is such that the trailer 102, if present, can be distinguished from the surrounding noise. When its clutter state is "not cluttered," the synchronous short range radar module 110 analyzes the radar data to determine whether the trailer 102 is attached to the vehicle 100 (e.g., the trailer detection state is either "trailer detected" or "trailer not detected").

When the clutter state is established or changes (e.g., from "pending" to "cluttered," etc.), the synchronous short range radar module 110 broadcasts a message indicating its state onto the vehicle data bus. After determining its own status, the synchronous short range radar module 110 determines whether to broadcast a message on the vehicle data bus regarding its trailer detection status based on a message indicating the clutter state and/or the trailer detection state of the other synchronous short range radar module 110 received via the vehicle data bus.

When the trailer detection state of the synchronous short range radar module 110 is "trailer detected," the synchronous short range radar module 110 broadcasts a message on the vehicle data bus so indicating. When the trailer detection state of the synchronous short range radar module 110 is "trailer not detected," the synchronous short range radar module 110 only broadcasts a message on the vehicle data bus indicating that the trailer is not connected (a) when the clutter state of the other synchronous short range radar module 110 is neither "pending" nor "cluttered" and (b) the trailer detection state of the other synchronous short range radar module 110 is not "trailer detected." Because one synchronous short range radar module 110 uses the status of the other synchronous short range radar module 110, the different synchronous short range radar modules 110 do not provide intermittent or contradictory messages to the driver and/or to the ECUs 106a-106e that control the vehicle differently based on the presence of a trailer 102. The illustrated example includes two synchronous short range radar modules 110. However, the vehicle 100 may include more than two synchronous short range radar modules 110 while still performing the handshake before providing a message of whether the trailer 102 is detected.

When blind spot detection is active, the synchronous short range radar modules 110 monitor the appropriate blind spot detection zones 116 and 118. For example, when the trailer 102 is detected, the synchronous short range radar modules 110 monitor the extended blind spot detection zones 118. The synchronous short range radar modules 110 provide an alert (e.g., via a message on the vehicle data bus) in response to detecting an object (e.g., another vehicle) within the monitored detection zones 116 and 118.

The instrument cluster 112 provides an interface between the vehicle 100 and a user. The instrument cluster 112 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. For example, the instrument cluster 112 may include a switch to toggle blind spot detection. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the instrument cluster 112 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In such examples, the instrument cluster 112 displays the infotainment system on, for example, the center console display. The instrument cluster 112 displays an indicator (e.g., on the dashboard display, on the infotainment system, etc.) that informs the driver of whether at least one of the synchronous short range radar modules 110 has detected the trailer 102 based on messages on the vehicle data bus. In some examples, when the trailer 102 is detected, the instrument cluster 112 prompts the driver to input the type and/or dimensions of the trailer into the infotainment system.

The active safety module 114 controls autonomous functions of the vehicle 100 based on measurements from range detection sensors (e.g., radar, LiDAR, ultrasonic sensors, infrared sensors, cameras, etc.). The active safety module 114 includes hardware (e.g., a processor or controller, memory, storage, etc.) and firmware to coordinate the automatic trailer detection system and/or the blind spot detection system. These functions include an anti-lock brake system, electronic stability control, roll stability control, traction control, brake assist, adaptive cruise control, and/or collision avoidance, etc. The active safety module 114 controls the vehicle 100 based on whether the trailer 102 is connected. The active safety module 114 controls the vehicle 100 based on the messages broadcast on the vehicle data bus by the synchronous short range radar modules 110. For example, the trailer 102 affects the traction of the vehicle 100. In such an example, the active safety module 114 adjusts the traction control system based on the added weight of the trailer 102 and the change is dynamic control caused by the trailer 102.

Figure 2:
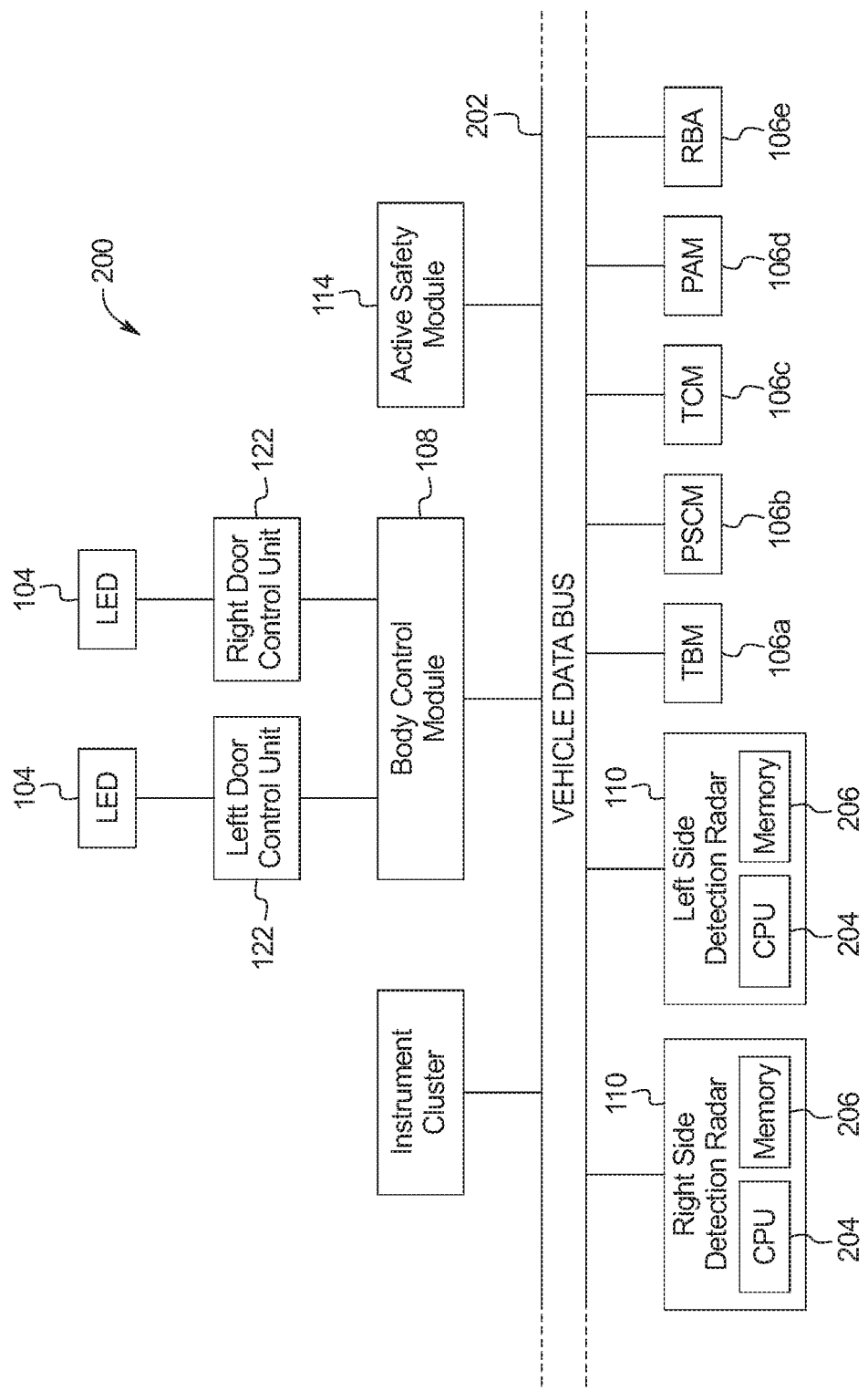
FIG. 2 is a block diagram of electronic components of the vehicle of FIG. 1.

FIG. 2 is a block diagram of electronic components 200 of the vehicle of FIG. 1. In the illustrated example, the electronic components 200 include the alert indicators 104, the ECUs 106a-106e, the body control module 108, the synchronous short range radar modules 110, the instrument cluster 112, the active safety module 114, the door control units 122, and a vehicle data bus 202.

The synchronous short range radar module 110 includes a processor or controller 204 and memory 206. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206 the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the ECUs 106a-106e, the body control module 108, the synchronous short range radar modules 110, the instrument cluster 112, and/or the active safety module 114, etc. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
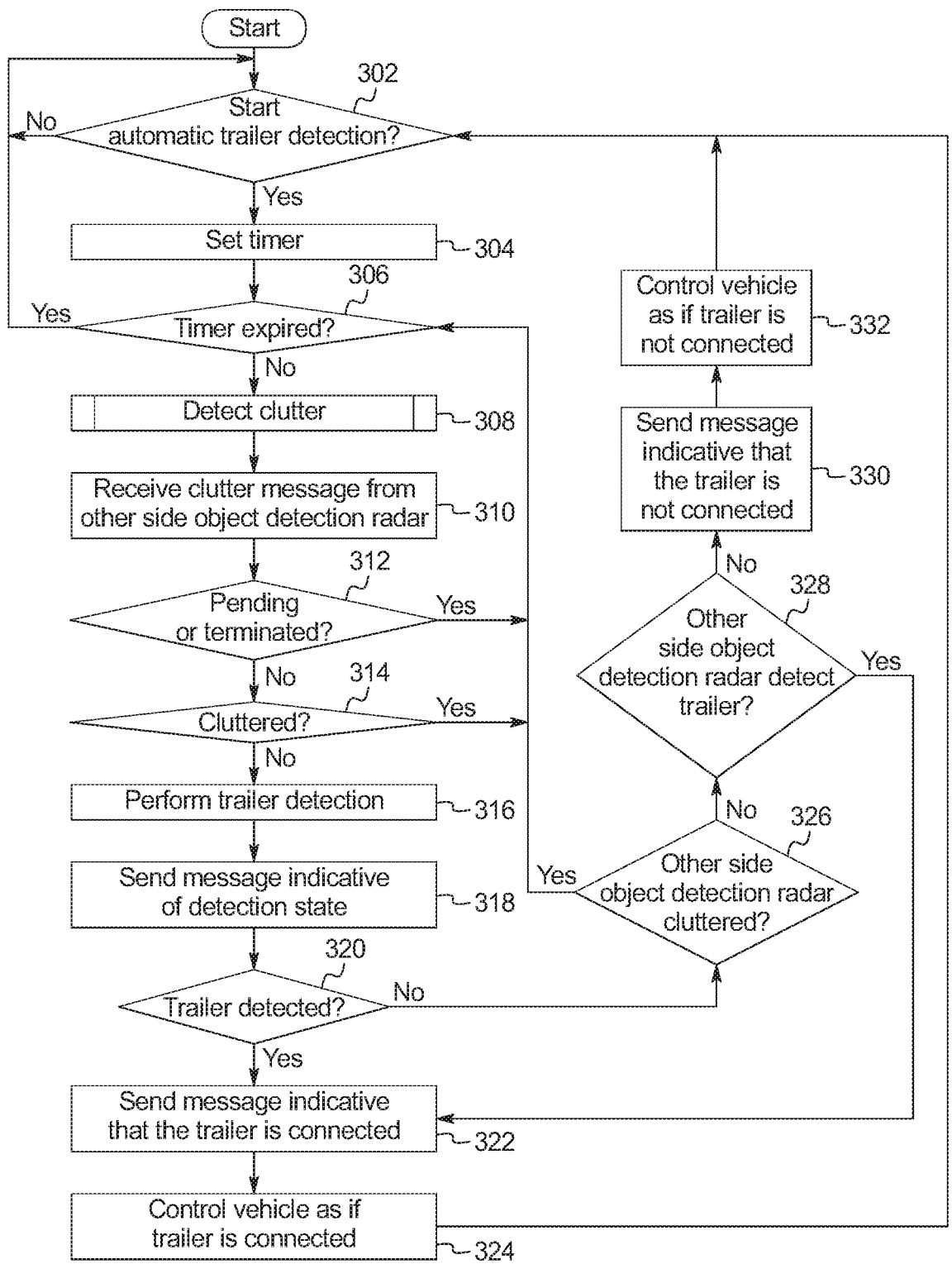
FIG. 3 is a flowchart of a method to determine whether the trailer is connected to the vehicle, which may be implemented by the electronic components of FIG. 2.

FIG. 3 is a flowchart of a method to determine whether the trailer 102 is connected to the vehicle 100, which may be implemented by the electronic components 200 of FIG. 2. Initially, at block 302, the active safety module 114 waits until the automatic trailer detection system is activated. For example, the driver may activate a setting via a hard switch or a virtual switch on the instrument cluster 112 or the automatic trailer detection system may be initiated autonomously at ignition startup or after a vehicle has been idling for a predetermine amount of time. At block 304, when the automatic trailer detection system is activated, the active safety module 114 sets a timer. At block 306, the active safety module 114 determines whether the timer has expired. When the timer has not expired, the method continues at block 308. Otherwise, when the timer has expired, the method returns to block 302.

At block 308, the synchronous short range radar module 110 determine whether the portion of the environment around the vehicle 100 that is within the field of view of the corresponding radar is cluttered. An example method of detecting clutter is described in connection with FIG. 4 below. At block 310, the synchronous short range radar module 110 receives the clutter message from the other synchronous short range radar module 110. At block 312, the synchronous short range radar module 110 determines whether its clutter status is "pending" or "terminated." When the clutter status of the synchronous short range radar module 110 is "pending" or "terminated," the method returns to block 306. Otherwise, when the clutter status of the synchronous short range radar module 110 is neither "pending" nor "terminated," the method continues at block 314. At block 314, the synchronous short range radar module 110 determines whether the environment within the field of view of its radar is cluttered. When the environment within the field of view of its radar is cluttered, the method returns to block 306. Otherwise, when the environment within the field of view of its radar is not cluttered, the method continues to block 316.

At block 316, the synchronous short range radar module 110 performs trailer detection via its radar. At block 318, the synchronous short range radar module 110 broadcasts a message for the other synchronous short range radar module 110 indicating its trailer detection state. At block 320, the synchronous short range radar module 110 determines whether the trailer 102 is detected. When the trailer 102 is detected, the method continues at block 322. Otherwise, when the trailer was not detected, the method continues at block 326.

At block 322, the synchronous short range radar module 110 broadcasts a message via the vehicle data bus 202 that the trailer 102 has been detected. At block 324, the ECUs 106a-106e, the instrument cluster 112 and/or the active safety module 114 control the subsystems of the vehicle 100 as if the trailer 102 is connected. For example, the instrument cluster 112 may display a notification that the trailer 102 is connected. Additionally, the synchronous short range radar module 110 monitors the extended blind spot detection zone 118 when the blind spot detection system is activated.

At block 326, the synchronous short range radar module 110 determines whether the other synchronous short range radar module 110 has indicated that its clutter status is "pending" or "cluttered." When the other synchronous short range radar module 110 has indicated that its clutter status is "pending" or "cluttered," the method returns to block 306. Otherwise, when the other synchronous short range radar module 110 has not indicated that its clutter status is "pending" or "cluttered," the method continues at block 328. At block 328, the synchronous short range radar module 110 determines whether the other synchronous short range radar module 110 has indicated that it has detected the trailer 102. When the other synchronous short range radar module 110 indicates that it has detected the trailer 102, the method continues at block 322. Otherwise, when the other synchronous short range radar module 110 does not indicate that it has detected the trailer 102, the method continues at block 330.

At block 330, the synchronous short range radar module 110 broadcasts a message via the vehicle data bus 202 that the trailer 102 has not been detected (e.g., a "Trailer Disconnected" message). At block 332, the ECUs 106a-106e, the instrument cluster 112 and/or the active safety module 114 control the subsystems of the vehicle 100 as if the trailer 102 is not connected. Additionally, the synchronous short range radar module 110 monitors the blind spot detection zone 116 when the blind spot detection system is activated.

Figure 4:
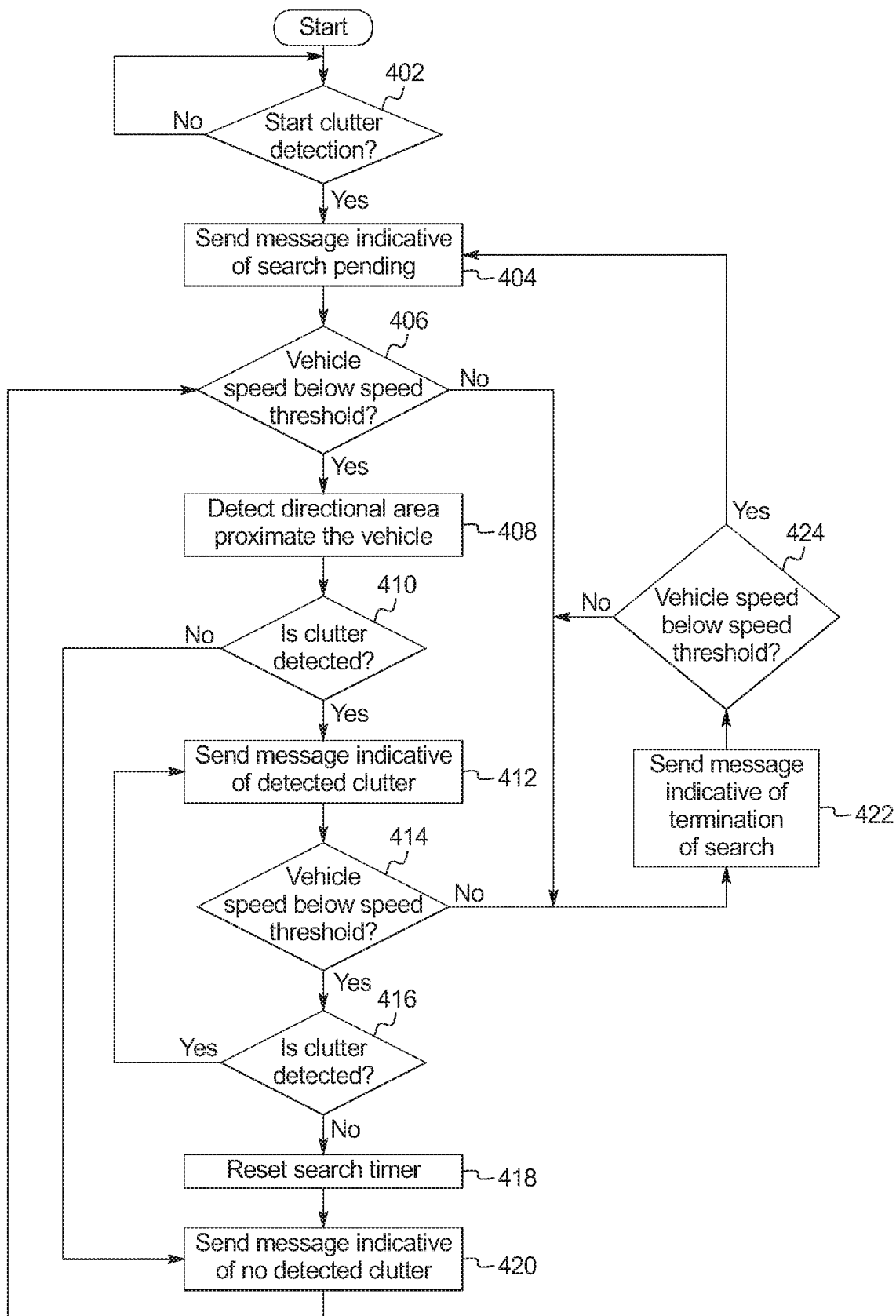
FIG. 4 is a flowchart of a method to determine whether the environment around the vehicle is cluttered, which may be implemented by the electronic components of FIG. 2.

FIG. 4 is a flowchart of a method to determine whether the environment around the vehicle 100 is cluttered, which may be implemented by the electronic components 200 of FIG. 2. Initially, at block 402, the synchronous short range radar module 110 waits until clutter detection is started. At block 404, the synchronous short range radar module 110 broadcasts a message indicative that the search for clutter is pending. At block 406, the synchronous short range radar module 110 determines whether the speed of the vehicle 100 is below a threshold speed (e.g., 10 miles per hour, 20 miles per hour, etc.). When the speed of the vehicle 100 is below the threshold speed, the method continues to block 408. Otherwise, when the speed of the vehicle 100 is above the threshold speed, the method continues to block 422.

At block 408, the synchronous short range radar module 110 begins to measure, with its radar, the area proximate the vehicle 100 that is within the field of view of the radar. At block 410, based on the measurements, the synchronous short range radar module 110 determines whether clutter is detected. When clutter is detected the method continues at block 412. Otherwise, when clutter is not detected, the method continues at block 420.

At block 412, the synchronous short range radar module 110 broadcasts a message indicative that it has detected clutter. At block 414, the synchronous short range radar module 110 determines whether the speed of the vehicle 100 is below the threshold speed. When the speed of the vehicle 100 is below the threshold speed, the method continues to block 416. Otherwise, when the speed of the vehicle 100 is above the threshold speed, the method continues to block 422. At block 416, based on the measurements of its radar, the synchronous short range radar module 110 determines whether clutter is detected. When clutter is detected the method returns to block 412. Otherwise, when clutter is not detected, the method continues at block 418.

At block 418, the synchronous short range radar module 110 resets its search timer. At block 420, the synchronous short range radar module 110 broadcasts a message indicative that clutter has not been detected.

At block 422, the synchronous short range radar module 110 broadcasts a message indicative that the search for clutter has been terminated. At block 424, the synchronous short range radar module 110 determines whether the speed of the vehicle 100 is below the threshold speed. When the speed of the vehicle 100 is below the threshold speed, the method returns to block 404. Otherwise, when the speed of the vehicle 100 is above the threshold speed, the method returns to block 422.

The flowcharts of FIGS. 3 and 4 are representative of machine readable instructions stored in memory (such as the memory 206 of FIG. 2) that comprise one or more programs that, when executed by a processor (such as the processor 204 of FIG. 2), cause the vehicle 100 to implement the example the synchronous short range radar modules 110 of FIGS. 1 and 2. Further, although the example program(s)

is/are described with reference to the flowcharts illustrated in FIGS. 3 and 4, many other methods of implementing the example the synchronous short range radar module 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. As used here, the terms "module" and "unit" refer to hardware with circuitry to provide communication, control and/or monitoring capabilities, often in conjunction with sensors. "Modules" and "units" may also include firmware that executes on the circuitry. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a first radar that monitors a first area proximate the vehicle;
    a second radar that monitors a second area proximate the vehicle, the first and second radars being communicatively coupled via a vehicle data bus, the second area being different than the first area; and
    a controller with a processor configured to:
        determine, using the first radar, an absence of clutter in the first area, wherein the clutter involves one or more reflective surfaces being within the first area;
        perform, using the first radar and based on the determination of the absence of the clutter in the first area, a first trailer detection in the first area; and
        determine, based on the first trailer detection, that a trailer is not connected to the vehicle;
        determine, using the second radar, an absence of clutter in the second area;
        perform, using the second radar and based on the determination of the absence of the clutter in the second area, a second trailer detection in the second area;
        determine, based on the second trailer detection, that a trailer is not connected to the vehicle; and
        send, based on both the determination by the first radar and the determination by the second radar that a trailer is not connected to the vehicle, an indication that a trailer is not connected to the vehicle.

2. The vehicle of claim 1, wherein the first radar and the second radar send clutter status messages on the vehicle data bus that indicate whether the corresponding one of the radar detects radar clutter.

3. The vehicle of claim 1, wherein the first radar and the second radar send detection status messages on the vehicle data bus that indicate whether the corresponding one of the radars detects the trailer.

4. The vehicle of claim 1, wherein the first radar and second radar are further configured to:
    increase, based on a determination that a trailer is connected to the vehicle, dimensions of an area of one or more blind spot detection zones monitored by the first radar and the second radar.

5. The vehicle of claim 4, including first and second blind spot indicators communicatively coupled with the first and second blind spot detect zones respectively, wherein when an object is detected in one of the blind spot detect zones, the corresponding one of the first and second radars is to activate the corresponding one of the first and second blind spot indicators.

6. The vehicle of claim 1, including an active safety module to control motive functions of the vehicle based on the indication that the trailer is not connected.

7. The vehicle of claim 1, wherein the first radar and the second radar are further configured to:
    determine that a trailer is connected to the vehicle; and
    send, based on the determination that the trailer is connected to the vehicle, and indication that the trailer is connected to the vehicle.

8. The vehicle of claim 1, wherein the controller is further configured to:
    determine that the vehicle is moving at below a threshold speed, wherein determining the absence of clutter in the first area and determining the absence of clutter in the second area are performed based on a determination that the vehicle is moving below the threshold speed.

9. A method comprising:
    determining, using a first radar that monitors a first area proximate a vehicle, an absence of clutter in the first area, wherein the clutter involves one or more reflective surfaces being within the first area;
    performing, using the first radar and based on the determination of the absence of the clutter in the first area, a first trailer detection in the first area; and
    determining, based on the first trailer detection, that a trailer is not connected to the vehicle; and
    determining, using a second radar that monitors a second area proximate the vehicle, an absence of clutter in the second area, wherein the first and second radars being communicatively coupled via a vehicle data bus, wherein the second area is different than the first area;
    performing, using the second radar and based on the determination of the absence of the clutter in the second area, a second trailer detection in the second area;
    determining, based on the second trailer detection, that a trailer is not connected to the vehicle; and
    sending, based on both the determination by the first radar and the determination by the second radar that a trailer is not connected to the vehicle, an indication that a trailer is not connected to the vehicle.

10. The method of claim 9, further comprising:
    determining that a trailer is connected to the vehicle; and
    sending, based on the determination that the trailer is connected to the vehicle, and indication that the trailer is connected to the vehicle.

* * * * *